Patented June 20, 1950

2,512,518

UNITED STATES PATENT OFFICE 2,512,518

HALOGENATED ACENAPHTHOYL ALKANOIC ACIDS

Robert R. Burtner, Skokie, Ill., assignor to G. D. Searle & Co., Skokie, Ill., a corporation of Illinois No Drawing. Application April 6, 1948, Serial No. 19,435

8 Claims. (Cl. 260—515)

This invention relates to acenaphthoylalkanoic acids which are substituted in the alkanoic acid radical by halogenation, to salts of these acids, and to processes for preparing these acids and salts. More particularly, it concerns keto acids of the general structural formula:

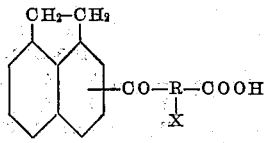

wherein R is a trivalent aliphatic hydrocarbon radical and X is halogen.

In the foregoing structural formula, R represents a trivalent saturated aliphatic hydrocarbon radical containing 2 to 8 carbon atoms. It therefore represents halogen-substituted radicals such as ethylene, propylene, trimethylene, 1,2-butylene, 2,3-butylene, tetramethylene, amylene, and related polymethylene radicals including octamethylene, as well as branched-chain alkylene radicals of the same number of carbon atoms. X stands for halogen atoms such as chlorine, iodine, or bromine. The halogen substituent X is believed to be in the α' position, that is, adjacent to the keto grouping.

The compounds of this invention are useful intermediates in the preparation of complex organic compounds such as steroids, dye stuffs, and medicinal agents. The compounds are furthermore of value as pharmaceuticals, plasticizers, and pesticides. It is the object of this invention to provide useful substances of the foregoing general type for the purposes recited above. It is a further object of this invention to provide efficient methods for obtaining such materials.

My invention is disclosed in further detail by the following compounds, which are representative of those within its scope:

A. β-5-acenaphthoyl-β-bromopropionic acid, which has the formula

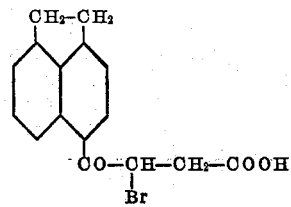

B. ω-5-acenaphthoyl-ω-bromopelargonic acid, having the formula

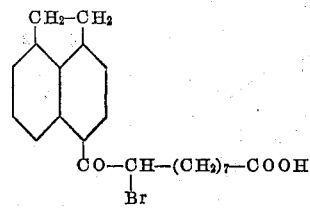

C. δ-3-acenaphthoyl-δ-bromovaleric acid, of the formula

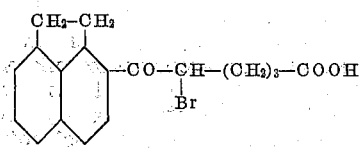

D. δ-5-acenaphthoyl-δ-chlorovaleric acid, which has the formula

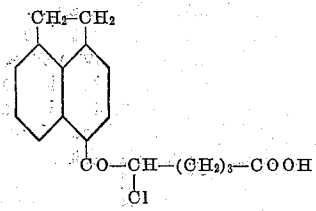

E. β-5-acenaphthoyl-β-bromoisobutyric acid, of the formula

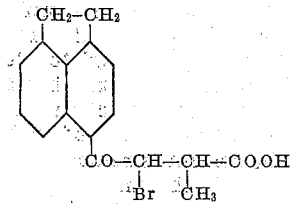

F. β-5-acenaphthoyl-α-methyl-β-chlorobutyric acid, having the formula

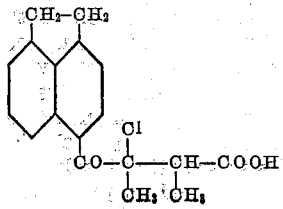

G. γ-3-acenaphthoyl-γ-bromobutyric acid, of the formula

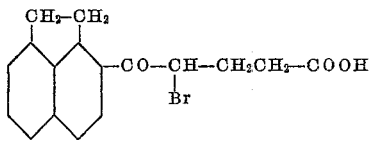

H. γ-5-acenaphthoyl-γ-chlorobutyric acid, of the formula

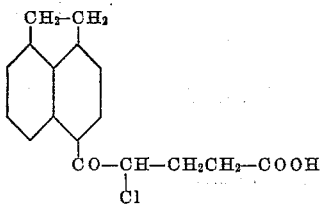

I. β-3-acenaphthoyl-β-bromopropionic acid, having the formula

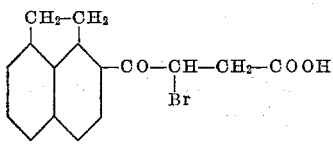

J. γ-5-acenaphthoyl-γ-bromoisovaleric acid, of the formula

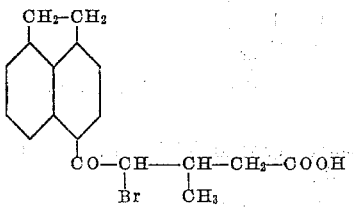

The compounds of my invention are obtained by halogenating an acenaphthoylalkanoic acid, preferably in the presence of an inert solvent such as acetic acid, carbon tetrachloride, chloroform, related halogenated hydrocarbon solvents, hydrocarbons such as cyclohexane, saturated petroleum hydrocarbon fractions, benzene, and the like. For halogenation agents, I prefer to use the free halogens, that is, elemental bromine or chlorine. Other halogenation agents, however, are suitable, among them being sulfuryl chloride or bromide, phosphorus tribromide or trichloride, and N-bromosuccinimide. One equivalent of halogenating agent is sufficient for the reaction and excesses are to be avoided. The halogenation reaction is preferably carried out under anhydrous conditions at slightly elevated temperatures, preferably between 50° and 100° centigrade, although lower temperatures are often satisfactory. The halogenation reactions generally take place very rapidly, and are usually complete within a matter of a few minutes. In certain instances it may be necessary to carry the reaction out over longer periods of an hour or two. After the reaction is complete, the solvent is removed and the halogenated keto acid is obtained in a state of purity as a residue. This may be crystallized and purified by conventional procedures.

Salts of the acids which comprise my invention may be prepared by solution of the acid in an alkaline carbonate solution, such as sodium carbonate, followed by salting-out with a salt, as for example sodium chloride. Likewise such salts may be prepared by treatment of an alcoholic solution of the acid with an alcoholic solution of a base. The salts are often insoluble in the alcohol and may be obtained as precipitates. In other cases another solvent such as ether or benzene may be added to throw down the salts. Salts of ammonia or aliphatic amines may be obtained by treating a solution of the acid in an organic solvent with a solution of the amine in a similar solvent and precipitating the desired salt with another miscible solvent in which the salt is insoluble. Water-soluble amines are preferred for salt formation, among them being the lower alkyl, dialkyl and trialkylamines as well as alkanolamines.

This application is a continuation-in-part of my copending application Serial No. 6,339, filed February 4, 1948.

My invention is further disclosed by means of the following examples, which are set forth for the purpose of illustration and which in no way are to be construed as limiting my invention in spirit or in scope. It will be apparent to those skilled in the art that innumerable conventional modifications in solvent, temperature, catalyst and reagents can be adopted without departure from the intent and purpose of this invention. Quantities of materials are given in parts by weight unless otherwise noted.

*Example 1*

A suspension of 164 parts of finely powdered β-(5-acenaphthoyl)propionic acid in 1640 parts of glacial acetic acid is stirred vigorously at 60° C. while a solution of 102.4 parts of bromine in 330 parts of glacial acetic acid is added dropwise, the temperature being maintained at 57–63° C. The addition takes approximately 1 hour. At the end of this time, the mixture is heated to 65–70° C. for a few minutes in order to complete the reaction. The mixture is then chilled and stirred for 30 minutes. About half the acetic acid is removed under reduced pressure. The residue is chilled, and the precipitate of β-bromo-β-(5-acenaphthoyl)propionic acid (compound A) is removed by filtration and dried. This acid, after recrystallization from acetic acid, melts at about 165° C. (with decomposition).

*Example 2*

A solution of 77 parts of acenaphthene and 57 parts of methylsuccinic anhydride (pyrotartaric anhydride) in 600 parts of nitrobenzene is chilled to 0° C. 133 parts of anhydrous aluminum chloride are added in small portions with vigorous agitation, while the temperature is maintained between 0° and 2° C. After the addition of aluminum chloride, the mixture is kept at room temperature for 40 hours. It is then decomposed with 500 parts of ice and 180 parts of concentrated hydrochloric acid. The nitrobenzene is removed by steam distillation, and the brown, granular residue thus obtained is dissolved in a hot solution of 100 parts of sodium carbonate in 1000 parts of water. This hot solution is filtered. The filtrate is acidified with concentrated hydrochloric acid, and the crude precipitate of β-(5-acenaphthoyl)isobutyric acid is formed. This is converted into its methyl ester by refluxing for 5 hours with 400 parts of methanol containing 46 parts of concentrated sulfuric acid. The hot methanolic solution is treated with decolorizing charcoal and filtered. Upon chilling, a small amount of tarry material forms, which is discarded. On continued chilling a crystalline precipitate forms. This is removed and recrystallized from petroleum ether with the use of decolorizing charcoal, to form white crystals of β-(5-acenaphthoyl)isobutyric acid methyl ester melting at 93–94° C.

The purified ester is saponified by refluxing with 250 parts of 10% methanolic potassium hydroxide for 1 hour. The chilled solution is poured into a mixture of 240 parts of concentrated hydrochloric acid and 500 parts of ice water. The precipitate of β-(5-acenaphthoyl)isobutyric acid is recrystallized from 75% methanol and then from benzene, and forms white crystals melting at 177-179° C. Bromination of 27 parts of this acid by the procedure of Example 1, using 16 parts of bromine and 1000 parts of hot glacial acetic acid at 75-80° C., affords β-(5-acenaphthoyl)-β-bromoisobutyric acid (compound E). This is isolated by removal of solvent under vacuum, addition of ice water, decantation, granulation and filtration.

*Example 3*

A solution of 631 parts of acenaphthene and 475 parts of glutaric anhydride in 5000 parts of nitrobenzene is cooled to 0° C. Then 1090 parts of anhydrous aluminum chloride are added portionwise with stirring, the temperature being maintained at 0-3° C. After the aluminum chloride is added, the mixture is stirred for two hours at ice temperature and then allowed to stand overnight, coming to room temperature during the period. The reaction mixture is quenched by pouring onto 10,000 parts of ice containing 1800 parts of muriatic acid. The nitrobenzene is removed by steam distillation and the residue is chilled. The granular precipitate is removed by filtration, ground to a thin suspension in water, collected on a filter and washed with water. This is taken up in 6700 parts of boiling water containing 340 parts of sodium carbonate. The hot solution is filtered to remove acenaphthene, and the filtrate is chilled and acidified. The crude γ-5-acenaphthoylbutyric acid is collected on a filter, washed, and dried. It is recrystallized from acetic acid using decolorizing charcoal, and forms sand-colored crystals melting at 167-169° C. Further recrystallization from acetic acid and from butyl acetate raises the melting point to 178-180° C.

36 parts of γ-5-acenaphthoylbutyric acid in 220 parts of methanol containing 26 parts of sulfuric acid are refluxed for 11 hours. The solution is then poured into 1200 parts of water containing 62 parts of sodium carbonate. The mixture is stirred for 10 minutes and filtered. The filter cake of methyl γ-5-acenaphthoylbutyrate is washed with water and dried. After recrystalization from ethanol this ester melts at 121° C. 20 parts of this ester are refluxed for 40 minutes in 240 parts of ethanol containing 15 parts of caustic potash. The crystalline potassium salt is removed from the chilled solution and dissolved in water. Upon acidification, γ-5-acenaphthoylbutyric acid is obtained, melting at about 203° C. Recrystallization from acetic acid does not change this melting point.

All the mother liquors obtained from the recrystallization of γ-5-acenaphthoylbutyric acid are combined and stripped of solvent under vacuum. The crude γ-3-acenaphthoylbutyric acid thus obtained is esterified by refluxing for 10 hours in a solution of 2200 parts of methanol containing 250 parts of concentrated sulfuric acid. The solvent is removed and the residue is poured into dilute sodium carbonate solution. The methyl γ-3-acenaphthoylbutyrate is extracted with ether, washed with water, dried and evaporated. It is crystallized from petroleum ether, and melts at 68° C. 295 parts of the crystalline ester are refluxed for 45 minutes in 2400 parts of ethanol containing 200 parts of caustic potash. The solvent is then stripped off in vacuum and the residue of potassium γ-3-acenaphthoylbutyrate is taken up in 4000 parts of water. Upon acidification γ-3-acenaphthoylbutyric acid melting at about 165° C. is isolated. Recrystallization from ethanol does not raise this melting point.

134 parts of γ-3-acenaphthoylbutyric acid in 5000 parts of hot acetic acid are reacted with 80 parts of bromine in 200 parts of acetic acid over a period of 20 minutes. The temperature is kept at 75-85° C. during the reaction. After an hour the solvent is removed and the residue is poured into about 2500 parts of ice water. The product so obtained is γ-(3-acenaphthoyl)-γ-bromobutyric acid (compound G).

*Example 4*

141 parts of δ-3-acenaphthoylvaleric acid (Burtner and Brown application, Serial No. 6,804, filed February 6, 1948) dissolved in 5000 parts of hot acetic acid are reacted at about 50° C., with agitation over a period of 5-10 minutes, with 80 parts of bromine in 200 parts of acetic acid. The mixture is stirred for 30 minutes longer while it is allowed to cool to room temperature. Most of the acetic acid is stripped off under reduced pressure, and the residue is diluted with 2000 parts of cold water. The precipitate of δ-3-acenaphthoyl-δ-bromovaleric acid (compound C) is removed by decantation, washed with methanol, and dried.

*Example 5*

A solution of 27 parts of γ-5-acenaphthoylbutyric acid in 1000 parts of glacial acetic acid at 60° C. is reacted with a stream of chlorine until 7.2 parts are taken up. Then the solvent is stripped off in vacuo and the residue is poured into cold water. There is obtained a precipitate of γ-5-acenaphthoyl-γ-chlorobutyric acid (compound H).

*Example 6*

A solution of 384 parts of bromine in 1100 parts of glacial acetic acid is added over a period of 20 minutes to a stirred suspension of 630 parts of β-3-acenaphthoylpropionic acid in 6300 parts of glacial acetic acid maintained at 58-62° C. The agitation is continued for 25 minutes after the addition is complete and then the solvent is removed by evaporation under reduced pressure. The residue of β-bromo-β-(3-acenaphthoyl)propionic acid rapidly crystallizes. It is suspended in about 800 parts of cold benzene, filtered and then washed with cold benzene. Upon recrystallization from toluene in the presence of decolorizing charcoal β-bromo-β-(3-acenaphthoyl)propionic acid (compound I) forms yellow crystals melting at 167° C. (with decomposition).

I claim:

1. A member of the group consisting of an acenaphthoyl-halo-alkanoic acid wherein the alkanoic acid radical contains three to nine carbon atoms and is attached to one of the positions of the acenaphthene nucleus numbered 3 and 5 and wherein the halo substituent is a halogen atom of atomic number greater than 9, and alkali metal salts thereof.

2. An acenaphthoyl-halo-alkanoic acid of the structural formula

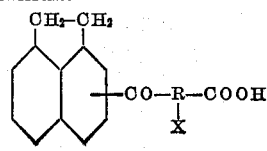

wherein R is a trivalent aliphatic hydrocarbon radical containing two to eight carbon atoms located at one of the positions of the acenaphthene nucleus numbered 3 and 5 and X is halogen of atomic number greater than 9.

3. An ω-acenaphthoyl-ω-haloalkanoic acid of the structural formula

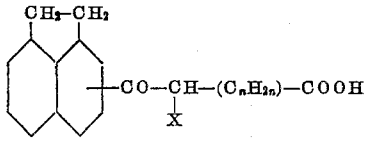

wherein X is halogen of atomic number greater than 9 and $n$ is an integer not greater than seven and wherein the halogenated keto alkanoic acid radical is attached to one of the positions of the acenaphthene nucleus numbered 3 and 5.

4. An acenaphthoyl-halo-alkanoic acid of the structural formula

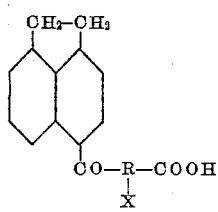

wherein R is a trivalent aliphatic hydrocarbon radical containing two to eight carbon atoms and X is halogen of atomic number greater than 9.

5. An ω-(5-acenaphthoyl)-ω-haloalkanoic acid of the structural formula

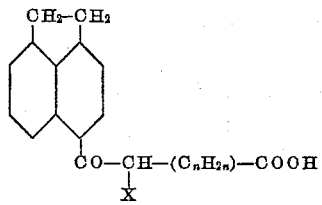

wherein X is halogen of atomic number greater than 9 and $n$ is an integer not greater than seven.

6. An ω-(5-acenaphthoyl) - ω - bromoalkanoic acid of the structural formula

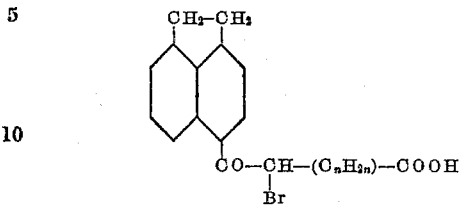

wherein $n$ is an integer not greater than seven.

7. A β-acenaphthoyl-β-haloalkanoic acid.
8. β-(5-acenaphthoyl)-β-bromopropionic acid.

ROBERT R. BURTNER.

REFERENCES CITED

The following references are of record in the file of this patent:

UNITED STATES PATENTS

| Number | Name | Date |
|---|---|---|
| 1,759,111 | Greune | May 20, 1930 |
| 1,889,347 | Bruson | Nov. 29, 1932 |
| 2,423,709 | Knott | July 8, 1947 |

OTHER REFERENCES

Fieser et al.: J. Am. Chem. Soc., vol. 54, pp. 4347–4356 (1932).